US011897638B2

(12) United States Patent
Akiyama et al.

(10) Patent No.: US 11,897,638 B2
(45) Date of Patent: Feb. 13, 2024

(54) PRESSURIZED STRUCTURE PANEL AND CYLINDER

(71) Applicant: MITSUBISHI HEAVY INDUSTRIES, LTD., Tokyo (JP)

(72) Inventors: Hiromichi Akiyama, Tokyo (JP); Naoto Azusawa, Tokyo (JP); Yutaka Terada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/861,550

(22) Filed: Jul. 11, 2022

(65) Prior Publication Data
US 2023/0020582 A1   Jan. 19, 2023

(30) Foreign Application Priority Data

Jul. 13, 2021   (JP) ................................. 2021-115987

(51) Int. Cl.
*B64G 1/54*   (2006.01)
*B64G 1/56*   (2006.01)

(52) U.S. Cl.
CPC .................................... *B64G 1/54* (2013.01); *B64G 1/56* (2013.01)

(58) Field of Classification Search
CPC ..................................... B64G 1/54; B64G 1/56
See application file for complete search history.

(56) References Cited

U.S. PATENT DOCUMENTS

| 2012/0273622 | A1* | 11/2012 | Long | G21F 7/00 244/171.7 |
| 2013/0095307 | A1* | 4/2013 | Bennington | B29C 39/02 428/221 |
| 2014/0319282 | A1* | 10/2014 | Bigelow | B64G 1/646 244/159.4 |
| 2015/0248941 | A1* | 9/2015 | Thibeault | G21F 1/10 252/478 |
| 2020/0143951 | A1* | 5/2020 | Harris, Jr. | B29C 70/882 |
| 2020/0148399 | A1* | 5/2020 | de Jong | B64G 1/56 |
| 2022/0128047 | A1* | 4/2022 | Rafalskyi | B64G 1/402 |

FOREIGN PATENT DOCUMENTS

JP   2004-020414        1/2004
JP   5569878 B2 *   8/2014

* cited by examiner

*Primary Examiner* — Richard G Davis
(74) *Attorney, Agent, or Firm* — Wenderoth, Lind & Ponack, L.L.P.

(57) ABSTRACT

A pressurized structure panel for forming a pressurized space pressurized inside includes a panel structure having a panel body to receive the pressure, a rib provided in the panel body, and a hollow part formed by the panel body and the rib, a radiation shielding material provided in the hollow part, and a debris bumper provided outside the panel structure and provided spaced apart from the panel structure by a certain spacing. The radiation shielding material includes a material containing hydrogen atoms in molecules.

9 Claims, 5 Drawing Sheets

PRESSURIZED STRUCTURE PANEL AND CYLINDER

CROSS-REFERENCE TO RELATED APPLICATIONS

The present application claims priority to and incorporates by reference the entire contents of Japanese Patent Application No. 2021-115987 filed in Japan on Jul. 13, 2021.

FIELD

The present disclosure relates to a pressurized structure panel and a cylinder.

BACKGROUND

Conventionally, shielding structures shielding high-energy charged particles such as cosmic rays have been known (refer to Japanese Patent Application Laid-open No. 2004-20414, for example). The shielding structure is a multiple structure including a first-layer shielding material formed of a light material with a low density for decelerating high-energy charged particles and a second-layer shielding material formed of a heavy material with a high density for decelerating the charged particles. Specifically, it is considered that aluminum is used as the light material in the first-layer shielding material, whereas tungsten or lead is used as the heavy material in the second-layer shielding material.

By the way, missions having a long staying time in outer space, such as space exploration, require improved shielding performance because of the limited exposure of humans to cosmic rays. Although metals such as aluminum are used as a shielding material in the shielding structure of Japanese Patent Application Laid-open No. 2004-20414, there is a possibility that the shielding performance may be insufficient in the above missions. In addition, debris, meteoroids, or the like may collide with a space vehicle such as a spacecraft, and even in a case of a collision, it is necessary to ensure a pressurized structure pressurized inside.

SUMMARY

A pressurized structure panel according to the present disclosure is for forming a pressurized space pressurized inside. The pressurized structure panel includes: a panel structure having a panel body to receive the pressure, a rib provided in the panel body, and a hollow part formed by the panel body and the rib; a radiation shielding material provided in the hollow part; and a debris bumper provided outside the panel structure and provided spaced apart from the panel structure by a certain spacing. The radiation shielding material includes a material containing hydrogen atoms in molecules.

A cylinder according to the present disclosure is formed in a tubular shape by the pressurized structure panel as described above.

DETAILED DESCRIPTION

In the following, embodiments according to the present disclosure are described in detail based on the drawings. Note that this invention is not limited by these embodiments. In addition, the components in the following embodiments include ones with which those skilled in the art can substitute and that are easy or substantially the same ones. Furthermore, the components described below can be combined with each other as appropriate, and if there are a plurality of embodiments, they can also be combined with each other.

First Embodiment

Figure 1:
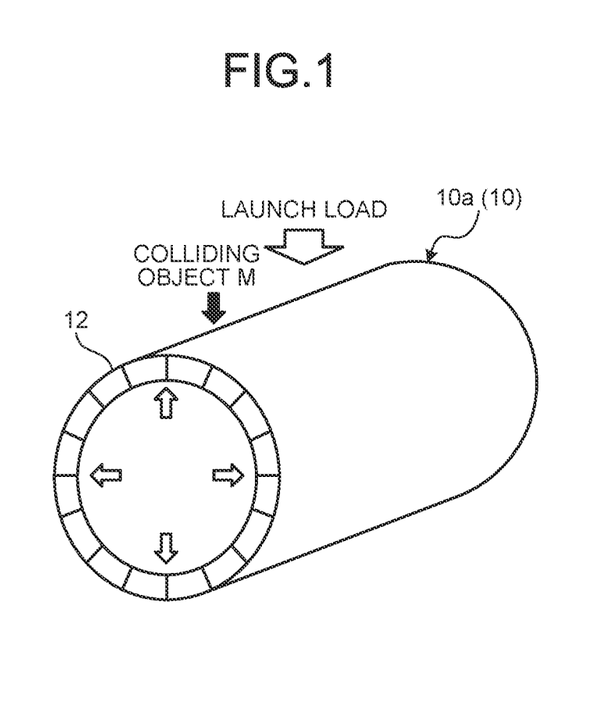
FIG. 1 is a schematic diagram illustrating an example of a cylinder according to a first embodiment.
Figure 2:
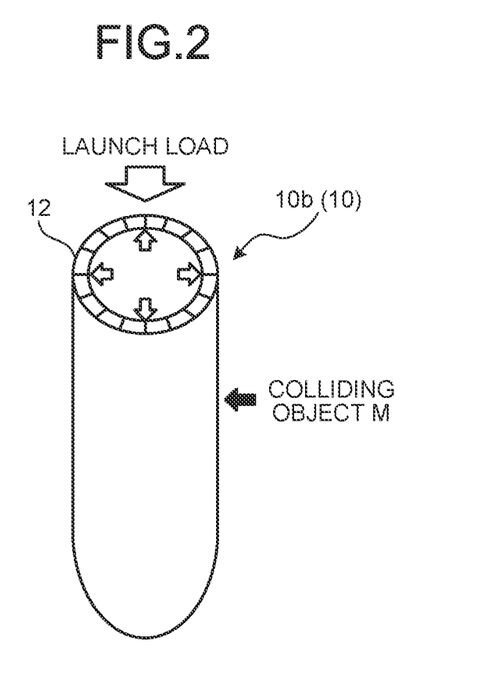
FIG. 2 is a schematic diagram illustrating another example of the cylinder according to the first embodiment.
Figure 3:
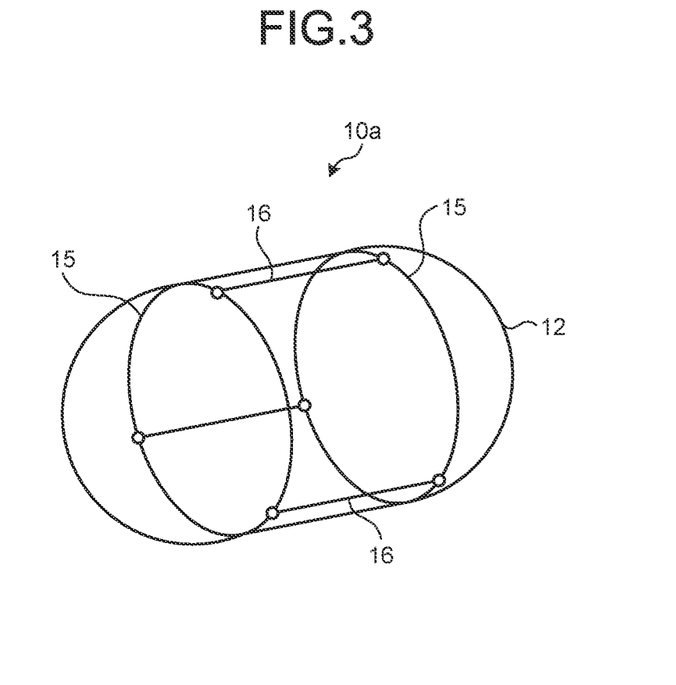
FIG. 3 is an illustrative diagram about a structure frame of the cylinder according to FIG. 1 of the first embodiment.
Figure 4:
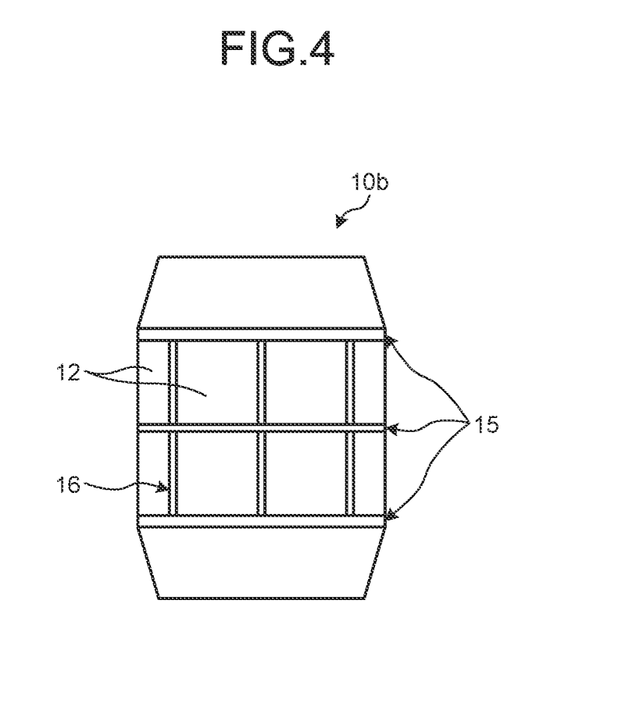
FIG. 4 is an illustrative diagram about a structure frame of the cylinder according to FIG. 2 of the first embodiment.
Figure 5:
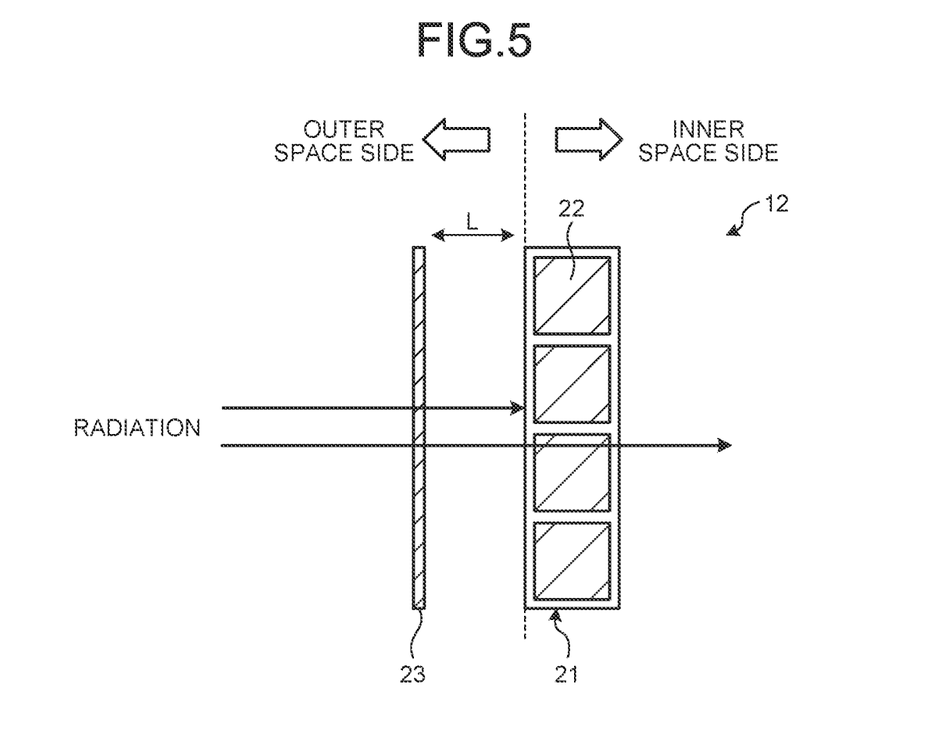
FIG. 5 is a sectional view schematically illustrating a pressurized structure panel according to the first embodiment.
Figure 6:
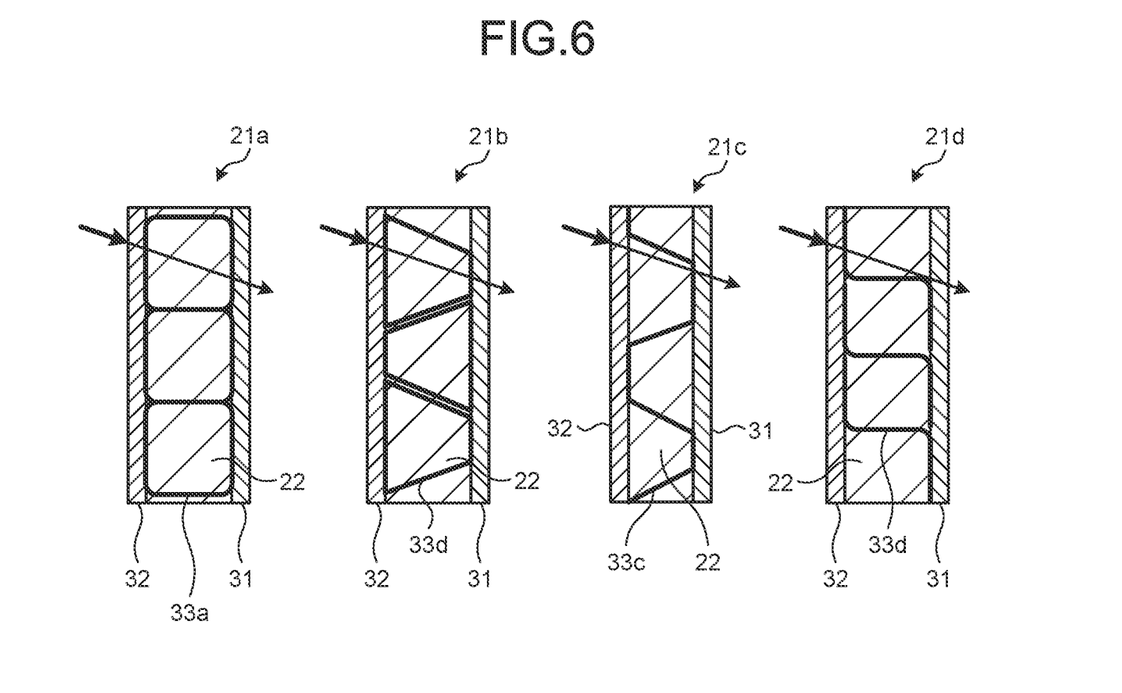
FIG. 6 is a sectional view illustrating an example of a panel structure of the pressurized structure panel.

FIG. 1 is a schematic diagram illustrating an example of a cylinder according to a first embodiment. FIG. 2 is a schematic diagram illustrating another example of the cylinder according to the first embodiment. FIG. 3 is an illustrative diagram about a structure frame of the cylinder according to FIG. 1 of the first embodiment. FIG. 4 is an illustrative diagram about a structure frame of the cylinder according to FIG. 2 of the first embodiment. FIG. 5 is a sectional view schematically illustrating a pressurized structure panel according to the first embodiment. FIG. 6 is a sectional view illustrating an example of a panel structure of the pressurized structure panel. First, referring to FIG. 1 to FIG. 4, a cylinder 10 is described.

Cylinder

The cylinder 10 of the first embodiment is provided in a spacecraft operating in outer space or a space vehicle navigating in outer space and is a structure having a pressurized space pressurized inside. The spacecraft is a lunar rover, or a mobile body moving on the lunar surface, for example. The space vehicle is a space station and a space supply vehicle supplying commodities to the space station, for example.

A cylinder 10a provided in the lunar rover as the spacecraft is in the form illustrated in FIG. 1. The cylinder 10a is formed in such a manner that a pressurized structure panel 12, which is described below, has a tubular shape. The tubular shape may be any sectional shape of a circular shape, an elliptical shape, and a polygonal shape in a cross section cut perpendicularly to the axial direction. The cylinder 10a is formed thereinside with a pressurized space, which is a hollow space in which pressure is applied. The cylinder 10a is mounted on a space transportation launch vehicle in such a manner that a load is applied downward in the radial direction of the cylinder 10a at the time of launching. Note that the cylinder 10a may be mounted on the space transportation launch vehicle in such a manner that a load is applied downward in the axial direction of the cylinder 10a at the time of launching as in a cylinder 10b, which is described below.

On the other hand, the cylinder 10b provided in the space supply vehicle as the space vehicle is in the form illustrated in FIG. 2. The cylinder 10b, like the cylinder 10a, is formed in such a manner that the pressurized structure panel 12, which is described below, has a tubular shape. The cylinder 10b is also formed thereinside with a pressurized space, which is a hollow space in which pressure is applied. The cylinder 10b is mounted on the space transportation launch vehicle in such a manner that a load is applied downward in the axial direction of the cylinder 10b at the time of launching. Note that the cylinder 10b, like the cylinder 10a, may also be mounted on the space transportation launch vehicle in such a manner that a load is applied downward in the radial direction of the cylinder 10b at the time of launching.

Note that the cylinder 10a and the cylinder 10b have a structure taking into account a colliding object M colliding with it from outer space as the outside. In addition, the cylinder 10a and the cylinder 10b have a structure attenuating radiation from outer space to shield the radiation. The target radiation is mainly charged particles such as protons and heavy ions.

As illustrated in FIG. 3, the cylinder 10a has a frame structure including ring frames 15 and longerons 16 connected to each other as a structure capable of withstanding a launch load, and an outer shell is formed by the pressurized structure panel 12. The ring frames 15 are provided on each side of the cylinder 10 in the axial direction and are formed in a shape matching the sectional shape of the cylinder 10a. A pair of ring frames 15 are provided facing each other in such a manner that their centers overlap with each other in the axial direction. The longerons 16 are members connecting the pair of ring frames 15 to each other and are long strength members. The longerons 16 are arranged in such a manner that their longitudinal direction is in the axial direction of the cylinder 10a, and the pair of ring frames 15 are connected to each side thereof. The longerons 16 are placed spaced apart from each other at certain intervals in the circumferential direction.

Next, referring to FIG. 4, a frame structure about the cylinder 10b in FIG. 2 is described. As illustrated in FIG. 4, the cylinder 10b, like the cylinder 10a, has a frame structure including the ring frames 15 and the longerons 16 connected to each other as a structure capable of withstanding the launch load, and an outer shell is formed by the pressurized structure panel 12. The ring frames 15 are provided on each side of the cylinder 10 in the axial direction (the up-and-down direction) and are members for mounting. In addition, the cylinder 10b has a structure in which a ring frame 15 is further added between the pair of upper and lower ring frames 15 in accordance with the size, shape, application, or the like of the cylinder 10b. The ring frames 15 are formed in a shape matching the sectional shape of the cylinder 10b. The pair of upper and lower ring frames 15 are provided facing each other in such a manner that their centers overlap with each other in the axial direction. The longerons 16 are members connecting the ring frames 15 to each other and are long strength members. The longerons 16, like the central ring frame 15, are members to be added in accordance with the size, shape, application, or the like of the cylinder 10b. The longerons 16 are placed in such a manner that their longitudinal direction is in the axial direction of the cylinder 10b, and the pair of ring frames 15, that is, the lower ring frame 15 and the central ring frame 15 and the central ring frame 15 and the upper ring frame 15, are connected to each side thereof. The longerons 16 are placed spaced apart from each other at certain intervals in the circumferential direction.

Pressurized Structure Panel

Referring to FIG. 5, the pressurized structure panel 12 is described. The pressurized structure panel 12 is a partition wall partitioning an outer space side as the outside and a pressurized space side (an inner space side) as the inside. The pressurized structure panel 12 includes, in order from the outer space side toward the pressurized space side, a debris bumper 23, a panel structure 21, and a radiation shielding material 22. At this time, the radiation shielding material 22 is provided inside the panel structure 21.

As illustrated in FIG. 5 and FIG. 6, the panel structure 21 (21a to 21d) is a structure forming an outer shell of the cylinder 10. The panel structure 21 has a sandwich panel structure including an inner panel 31, an outer panel 32, and an intermediate member 33 (33a to 33d).

The inner panel 31 is a panel body provided inside the cylinder 10 and functions as a wall body receiving the pressure in the pressurized space. The outer panel 32 is provided on the outer space side with respect to the inner panel 31 and is provided facing the inner panel 31.

The intermediate member 33 functions as a rib protruding from the inner panel 31 and is a member forming a hollow part between the inner panel 31 and the outer panel 32.

The inner panel 31, the outer panel 32, and the intermediate member 33 are integrated with each other by joining one side of the intermediate member 33 in the thickness direction to the inner panel 31 and joining the other side of the intermediate member 33 in the thickness direction to the outer panel 32. At this time, the space partitioned by the inner panel 31 and the intermediate member 33 and the space partitioned by the outer panel 32 and the intermediate member 33 are formed as the hollow part. In such a panel structure 21, even if the outer panel 32 is damaged by the colliding object M such as debris, the pressurized space can be maintained by the inner panel 31. Note that the panel structure 21 may be further provided with partition walls dividing the hollow part into a plurality of parts. In this case, a plurality of hollow parts divided by the partition walls can each be an independent space. Thus, even if a certain hollow part communicates with outer space due to the collision of the colliding object M, it becomes an independent space, and thus the other hollow parts can be prevented from communicating with outer space.

Note that the panel structure 21, that is, the inner panel 31, the outer panel 32, and the intermediate member 33, are formed using a composite material including reinforcing fibers impregnated with resin. As the composite material, carbon fiber reinforced plastic (CFRP) is used, for example. Note that although metals such as aluminum alloys may be used for the panel structure 21, which is not limited to a particular material, CFRP is more preferable because CFRP has higher radiation shielding properties than aluminum alloys do.

Referring now to FIG. 6, an example of the intermediate member 33 of the panel structure 21 is described. Member pieces 33a of the panel structure 21a in FIG. 6 are an example of the intermediate member and are arranged in the in-plane direction of the panel. The member pieces 33a are formed in a square tubular shape with a rectangular cross section and are arranged adjacent to each other in the in-plane direction of the panel within the cross section. Note that if a gap created when the member pieces 33a are arranged is large, the gap may be filled with adhesive, or filler may be poured thereinto. Member pieces 33b of a panel structure 21b in FIG. 6 are an example of the intermediate member 33 and are arranged in the in-plane direction of the panel. The member pieces 33b are formed in a square tubular shape with a trapezoidal cross section and are arranged adjacent to each other in the in-plane direction of the panel within the cross section. Note that the member pieces 33b are provided in such a manner that the upper bottom side region and the lower bottom side region are alternated in the in-plane direction. Note that for the member pieces 33b, like the member pieces 33a, if a gap created when the member pieces 33b are arranged is large, the gap may be filled with adhesive, or filler may be poured thereinto. A corrugated member 33c of the panel structure 21c in FIG. 6 is an example of the intermediate member 33, which is formed in a wavy corrugated shape having peaks and valleys. The corrugated member 33c functions as a rib and thus has a shape and an arrangement capable of withstanding the launch load. Member pieces 33d of a panel structure 21d in FIG. 6 are an example of the intermediate member 33 and are arranged in the in-plane direction of the panel. The member pieces 33d are formed in a shape with a Z-like cross section by a region in contact with the inner panel 31, a region in contact with the outer panel 32, and a region connecting these regions to each other. The member pieces 33d are arranged adjacent to each other in the in-plane direction of the panel within the cross section.

The radiation shielding material 22 is placed in the hollow part of the panel structure 21. For the radiation shielding material 22, a material containing many hydrogen atoms in molecules is used. The material containing many hydrogen atoms in molecules is a material having a molecule with a larger Z (atomic number)/A (mass number) and a smaller A than that of aluminum contained in conventional structures. Specifically, the radiation shielding material 22 is an organic material, a hydride, water, or the like. The organic material may contain at least carbon (C), hydrogen (H), and oxygen (O), and polyolefin-based polyethylene (PE), polypropylene (PP), and the like may be used.

The radiation shielding material 22 may, as an aspect, circulate a liquid used in the spacecraft through the hollow part of the panel structure 21. The liquid includes wastewaters such as domestic wastewater staying within the spacecraft and liquids other than wastewaters, for example, waters such as drinking water, liquids for thermal control, and fuels. In addition, the radiation shielding material 22 may, as an aspect, place a shield made of an organic material in the hollow part of the panel structure 21. In addition, the radiation shielding material 22 may, as an aspect, place a compound containing many hydrogen atoms, such as a complex hydride, in the hollow part of the panel structure 21. At this time, when the compound is a liquid, it is put into a bag made of polyethylene or the like, and the entire bag is placed in the hollow part. In addition, the radiation shielding material 22 may, as an aspect, place a bag containing methylcyclohexane in the hollow part of the panel structure 21. Note that when methylcyclohexane is used, hydrogen can be generated by changing methylcyclohexane to toluene through a hydrogen generation reaction, and thus a fuel can be used as the radiation shielding material 22. In addition, the radiation shielding material 22 may, as an aspect, place a water-absorbent polymer as a precursor in the hollow part of the panel structure 21. In this case, water is procured on the spot, and the water-absorbent polymer is caused to absorb the water, thereby functioning as the radiation shielding material 22.

Note that when the liquid is used as the radiation shielding material 22, a temperature adjustment unit configured to adjust the temperature of the liquid may be further provided. With this, by performing temperature adjustment, the liquid can be maintained in a liquid phase, and the liquid can be inhibited from undergoing a phase transition. Note that when a heat control liquid such as ammonia is used as the liquid, it can be caused to not only function as the radiation shielding material 22 but also function as the temperature adjustment unit, and thus it can concurrently have the functions, which is efficient. In addition, when the liquid is used as the radiation shielding material 22, a pressure adjustment unit configured to adjust the pressure of the liquid may be further provided. With this, by performing pressure adjustment, the liquid can be maintained in a liquid phase, and the liquid can be inhibited from undergoing a phase transition.

As illustrated in FIG. 5, the debris bumper 23 is provided outside the panel structure 21 and is provided spaced apart from the panel structure 21 by a certain spacing L. The debris bumper 23 is a member, when the colliding object M collides therewith, diffusing the colliding object M to reduce impact. The debris bumper 23 is formed using a composite material including reinforcing fibers impregnated with resin. Note that for the debris bumper 23, metals such as aluminum alloys may be used, which is not limited to a particular material.

In the first embodiment, at least either the panel structure 21 or debris bumper 23 may be a composite material, such a configuration imparts radiation shielding performance.

In addition, the pressurized structure panel 12 may be further provided with a debris shield for additional measures for debris, an insulator for temperature control, a reflective material, a rack, and the like. The debris shield is a member receiving the colliding object M diffused by the debris bumper 23. The debris shield may be provided between the debris bumper 23 and the panel structure 21 or inside the panel structure 21 (it may be close to the inner panel 31 or close to the outer panel 32). The insulator is a member adjusting temperature and, in addition to adjusting the temperature of the pressurized space inside the cylinder 10, when the radiation shielding material 22 is the liquid, also functions as the temperature adjustment unit configured to adjust the temperature of the liquid. The insulator may be placed between the debris bumper 23 and the panel structure 21, be placed outside the debris bumper 23, or be provided inside the panel structure 21. When the temperature adjustment cannot be done by the insulator, a thermal control mechanism such as a heater or a heat pipe may be added. The reflective material is a film reflecting light incident from outer space on the cylinder 10. The reflective material is formed on the debris bumper 23 and is provided on the outermost surface on the outer space side. The rack is a member storing therein equipment provided inside the panel structure 21. The rack and the equipment can also improve radiation shielding performance inside the cylinder 10, and thus the rack is also desirably a hydrogen-rich material (CFRP or PE, for example).

In the pressurized structure panel 12 described above, upon incidence of radiation such as charged particles from the outer space side on the cylinder 10, the radiation is shielded by the debris bumper 23, the panel structure 21, and the radiation shielding material 22. With this, the pressurized structure panel 12 improves in radiation shielding performance. In addition, in the pressurized structure panel 12, even in a case of collision with the colliding object M from the outer space side, the debris bumper 23 can diffuse the colliding object M. In addition, even in a case of collision of the diffused colliding object M with the panel structure 21, the outer panel 32 receives the impact of the colliding object M, thereby preventing the inner panel 31 from being damaged and maintaining the pressure in the pressurized space by the inner panel 31.

Second Embodiment

Figure 7:
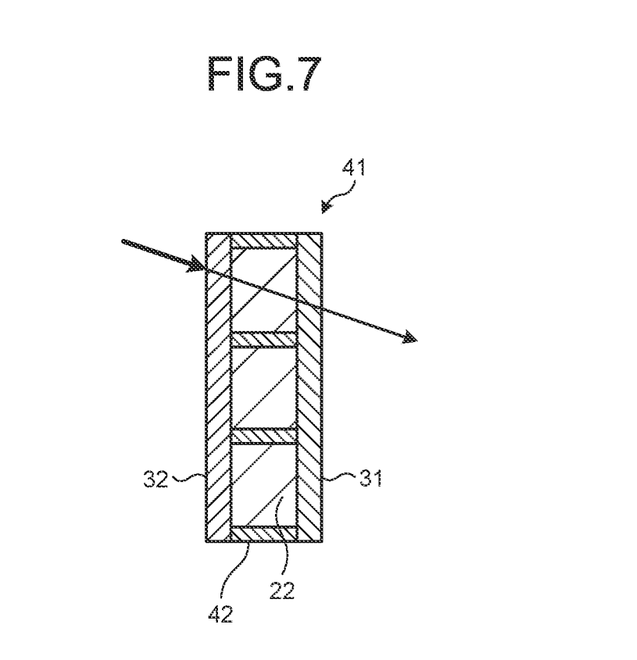
FIG. 7 is a sectional view schematically illustrating a pressurized structure panel according to a second embodiment.

Next, referring to FIG. 7, a second embodiment is described. Note that in the second embodiment, to avoid duplicate descriptions, a part different from that of the first embodiment is described, whereas parts having the same configuration as those of the first embodiment are described denoted by the same symbols. FIG. 7 is a sectional view schematically illustrating a pressurized structure panel according to the second embodiment.

The second embodiment replaces the panel structure 21 of the pressurized structure panel 12 of the first embodiment with a panel structure 41. The panel structure 41 of the second embodiment has a honeycomb sandwich structure including the inner panel 31, the outer panel 32, and a honeycomb core 42. The inner panel 31 and outer panel 32 are the same as those of the first embodiment, and thus descriptions thereof are omitted.

The honeycomb core 42 is a honeycomb-shaped structure in which a plurality of cores, such as hexagonal cores, rectangular cores (OX cores), and flex cores, are arranged. The honeycomb core 42 functions as a rib protruding from the inner panel 31. The inner panel 31, the outer panel 32, and the honeycomb core 42 are joined together to be integrated. The inner panel 31, the outer panel 32, and the honeycomb core 42 are joined together to form a plurality of partitioned hollow parts. The hollow parts are provided with the radiation shielding material 22 like the first embodiment. The hollow parts are each an independent space. Thus, even if a certain hollow part communicates with outer space due to the collision of the colliding object M, it becomes an independent space, and thus the other hollow parts can be prevented from communicating with outer space.

Third Embodiment

Figure 8:
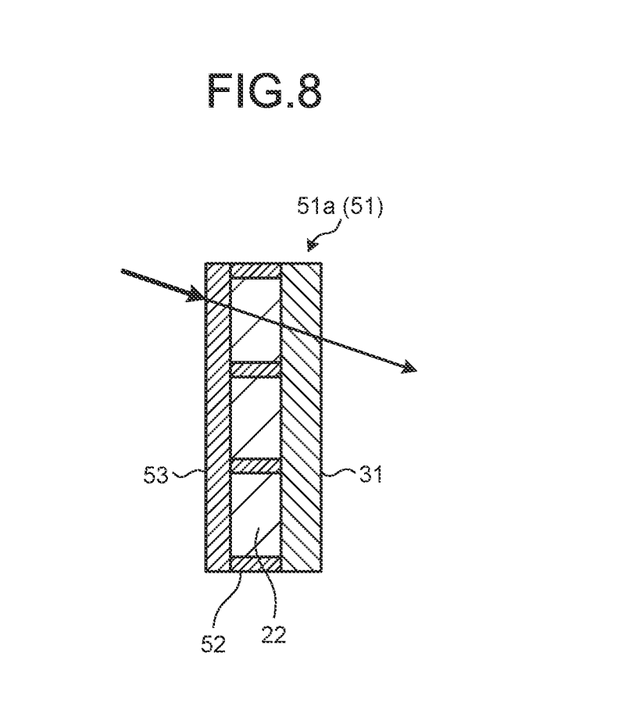
FIG. 8 is a sectional view schematically illustrating an example of a pressurized structure panel according to a third embodiment.
Figure 9:
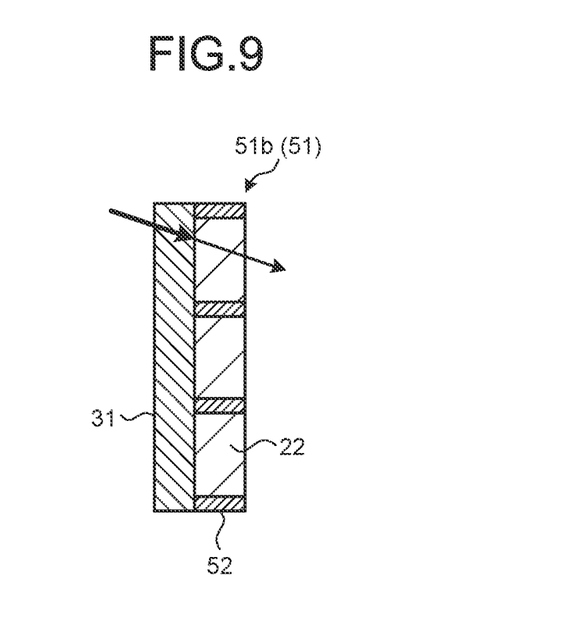
FIG. 9 is a sectional view schematically illustrating another example of the pressurized structure panel according to the third embodiment.

Next, referring to FIG. 8 and FIG. 9, a third embodiment is described. Note that in the third embodiment, to avoid duplicate descriptions, a part different from that of the first and second embodiments is described, whereas parts having the same configuration as those of the first and second embodiments are described denoted by the same symbols. FIG. 8 is a sectional view schematically illustrating an example of a pressurized structure panel according to the third embodiment. FIG. 9 is a sectional view schematically illustrating another example of the pressurized structure panel according to the third embodiment.

The third embodiment replaces the panel structure 21 of the pressurized structure panel 12 of the first embodiment with a panel structure 51. The panel structure 51 of the second embodiment has an isogrid structure including the inner panel 31 and a rib 52. The inner panel 31 is the same as that of the first embodiment, and thus a description thereof is omitted. Although the panel structure 51 has the isogrid structure in the second embodiment, it may have a waffle structure, skin-stringer structure, or the like.

In a panel structure 51a illustrated in FIG. 8, the rib 52 is provided protruding toward the outside of the inner panel 31. The panel structure 51a is formed with hollow parts partitioned by the inner panel 31 and the rib 52. The hollow parts are provided with the radiation shielding material 22 like the first and second embodiments. In this case, the radiation shielding material 22 is exposed to the outside, and thus in FIG. 8, a surface panel 53 covering the rib 52 and the radiation shielding material 22 is provided. The surface panel 53 preferably has radiation shielding performance and is formed of a composite material, for example.

In a panel structure 51b illustrated in FIG. 9, the rib 52 is provided protruding toward the inside of the inner panel 31. The panel structure 51b is formed with hollow parts partitioned by the inner panel 31 and the rib 52. The hollow parts are provided with the radiation shielding material 22 like the first and second embodiments. In this case, the radiation shielding material 22 is exposed to the inside, and thus in FIG. 9, the surface panel 53 in FIG. 8 can be omitted.

As in the above, the pressurized structure panel 12 and the cylinder 10 described in the embodiments are understood as follows, for example.

The pressurized structure panel 12 according to a first aspect is the pressurized structure panel 12 for forming a pressurized space pressurized inside including the panel structure 21 having a panel body (the inner panel 31) receiving the pressure, a rib (the intermediate member 33, the member pieces 33a, 33b, and 33d, the corrugated member 33c, the honeycomb core 42, or the rib 52) provided in the panel body, and a hollow part formed by the panel body and the rib, the radiation shielding material 22 provided in the hollow part, and the debris bumper 23 provided outside the panel structure 21 and provided spaced apart from the panel structure 21 by the certain spacing L, and the radiation shielding material 22 contains a material containing hydrogen atoms in molecules.

With this configuration, the radiation shielding material 22 can shield radiation, and thus radiation shielding performance can be improved. In addition, the debris bumper 23 can diffuse the colliding material M, and thus impact on the panel structure 21 can be mitigated. Thus, debris protection performance can be improved.

As a second aspect, the panel structure 21 has a sandwich panel structure including the inner panel 31 as the panel body, the outer panel 32 provided outside the inner panel 31, and the intermediate member 33 provided between the inner panel 31 and the outer panel 32, as the rib forming the hollow part.

With this configuration, even if the colliding object M diffused by the debris bumper 23 hits the panel structure 21, the outer panel 32 receives the impact of the colliding object M, whereby damage to the inner panel 31 can be prevented, and thus the pressure in the pressurized space can be maintained by the inner panel 31.

As a third aspect, at least either the panel structure 21 or the debris bumper 23 is a composite material including reinforcing fibers impregnated with resin.

With this configuration, radiation shielding performance can be imparted to at least either the panel structure 21 or the debris bumper 23, and thus radiation shielding performance can be further improved.

As a fourth aspect, the radiation shielding material is a liquid.

With this configuration, liquids used in a spacecraft or a space vehicle provided with the pressurized structure panel 12 can be used as the radiation shielding material.

As a fifth aspect, a temperature adjustment unit configured to adjust a temperature of the liquid is further included.

With this configuration, the temperature of the liquid is adjusted by the temperature adjustment unit, whereby the phase transition of the liquid can be inhibited, and an influence by the liquid on the panel structure 21 can be reduced.

As a sixth aspect, the radiation shielding material 22 contains a water-absorbent polymer as a precursor, and the water-absorbent polymer absorbs water to become the radiation shielding material 22.

With this configuration, an increase in the weight of the panel structure 21 can be prevented.

The cylinder 10 according to a seventh aspect is formed in a tubular shape by the pressurized structure panel 12.

With this configuration, the cylinder 10 having high radiation shielding performance and high debris protection performance can be achieved.

While certain embodiments have been described, these embodiments are not intended to limit the scope of the inventions. The components in the embodiments include ones that a person skilled in the art can easily conceive of, ones that are substantially the same, or ones that fall within their equivalents. Furthermore, various omissions, substitutions, combinations, and changes may be made as appropriate to configurations of the components disclosed in the embodiments without departing from the spirit of the inventions.

What is claimed is:

1. A pressurized structure panel for forming a pressurized space pressurized inside, the pressurized structure panel comprising:
    a panel structure having a panel body to receive pressure, a rib provided in the panel body, and a hollow part formed by the panel body and the rib;
    a radiation shielding material provided in the hollow part; and
    a debris bumper outside the panel structure and spaced apart from the panel structure by a gap therebetween,
    wherein the radiation shielding material includes a material containing hydrogen atoms in molecules.

2. The pressurized structure panel according to claim 1, wherein the panel structure has a sandwich panel structure including:
    an inner panel serving as the panel body,
    an outer panel outside the inner panel, and
    an intermediate member between the inner panel and the outer panel, the intermediate member serving as the rib forming the hollow part.

3. The pressurized structure panel according to claim 1, wherein at least one of the panel structure and the debris bumper comprises a composite material including reinforcing fibers impregnated with a resin.

4. The pressurized structure panel according to claim 1, wherein the radiation shielding material is a liquid.

5. The pressurized structure panel according to claim 4, further comprising a temperature adjustment unit configured to adjust a temperature of the liquid.

6. The pressurized structure panel according to claim 1, wherein the radiation shielding material includes a water-absorbent polymer serving as a precursor, and
    wherein the water-absorbent polymer is configured to absorb water to form the radiation shielding material.

7. A cylinder formed in a tubular shape, the cylinder comprising the pressurized structure panel according to claim 1.

8. The pressurized structure panel according to claim 1, wherein the material containing hydrogen atoms in molecules is a material having molecules with a larger Z/A ratio and a smaller A than aluminum, wherein Z is atomic number and A is mass number.

9. The pressurized structure panel according to claim 1, wherein the radiation shielding material includes water circulating through the hollow part of the panel structure.

* * * * *